United States Patent [19]

Oka et al.

[11] Patent Number: 4,874,931

[45] Date of Patent: Oct. 17, 1989

[54] METHOD FOR AUTOMATIC BILL HANDLING AND BILL CONTAINER USED THEREFOR

[75] Inventors: Yoshinobu Oka, Yokohama; Koichi Sato, Fujisawa, both of Japan

[73] Assignee: International Business Machines Corp., Armonk, N.Y.

[21] Appl. No.: 244,680

[22] Filed: Sep. 14, 1988

[30] Foreign Application Priority Data

Sep. 17, 1987 [JP] Japan ............................... 62-231259

[51] Int. Cl.[4] ............................................ G06F 15/30

[52] U.S. Cl. ..................................... 235/379; 902/17

[58] Field of Search ........................... 235/379; 902/17

[56] References Cited

U.S. PATENT DOCUMENTS 4,638,434 1/1987 Aizaki ................................ 235/379

*Primary Examiner*—Harold I. Pitts

*Attorney, Agent, or Firm*—Perman & Green

[57] ABSTRACT

Functional parts which have a high probability of abnormal operation, e.g., bill jams, are built into a detachable bill container, and the transfer of bills is not performed in the main body of the automatic bill handling machine (i.e., bills are handled only within the detachable bill container). Those parts include the parts which perform mechanical operations such as the picking up of bills, one by one, stacking the bills in a temporary storage area, and conveying them to an outlet or withdrawal bill storage area. The bill container in which a bill jam has occurred may be replaced with a spare bill container, thus allowing the jammed bills to be retained in the replaced container.

7 Claims, 4 Drawing Sheets

METHOD FOR AUTOMATIC BILL HANDLING AND BILL CONTAINER USED THEREFOR

FIELD OF THE INVENTION

This invention relates to a method for automatic handling of sheets having monetary values such as bills, securities and tickets (hereinafter referred to as bills), and to a detachable bill container used in the implementation of the method.

BACKGROUND OF THE INVENTION

A conventional automatic cash dispenser is composed of separate units such as a bill container, a bill conveying path and a bill outlet. Bills drawn out of the bill container, in response to a user's instruction, are conveyed by conveyor means (such as rollers and belts) and are delivered to the user. However, normal movement of the bills is often precluded because the bills, in passing from person to person, become creased or limp or bills with different strength papers are mixed. This frequently causes the jamming of bills at belts or guide rails. In prior art apparatus, e.g. as represented by Japanese Published Unexamined Patent Application No. 61-7991(1986), the place where the jam may occur in the process is outside the bill container.

Since the jamming of bills often occurs after the bills are drawn out of the bill container, the bills remain in the bill conveying path, on the main body side of the automatic cash dispenser. Although the operation of the machine can be restored by the operator, "jammed bills", which may be torn into pieces during removal, must be handled by persons trained and authorized for security. Therefore, if the machine is to be operated for a long time, for example, after the bank is closed, it is difficult to secure authorized operators; the downtime of the machine increases; and operating costs increase.

Heretofore, since only bank employees were operators of such machines, the machines could be operated if the above problems were ignored. In systems which operate on a 24 hour basis, the machines are often operated by a third party (e.g., by a security company) on a contract basis. Also, if a credit company, for instance, installs automatic cash dispensers in supermarkets and the like, the machines are operated by supermarket employees (including part-time employees) but the cash is handled by the employees of the security company.

However, if jammed bills occur in the main body of the machine outside of the bill container, responsible persons must be carefully controlled and excessive costs are unavoidable.

Accordingly, it is an object of this invention to provide a method for automatic bill handling which enables machine recovery without the necessity to touch the bills when the jam occurs.

Another object of this invention is to provide an improved bill container for use in the implementation of an automatic bill handling system.

A further object of this invention is to provide a bill container which includes an intelligent function.

SUMMARY OF THE INVENTION

Functional parts which have a high probability of abnormal operation, e.g. bill jams, are built into a detachable bill container, and the transfer of bills is not performed in the main body of the automatic bill handling machine (i.e., bills are handled only within the detachable bill container). Those parts include the parts which perform mechanical operations such as the picking up of bills, one by one, stacking the bills in a temporary storage area, and conveying them to an outlet or withdrawal bill storage area.

The bill container in which a bill jam has occurred may be replaced with a spare bill container, thus allowing the jammed bills to be retained in the replaced container.

DETAILED DESCRIPTION OF THE INVENTION

Figure 4:
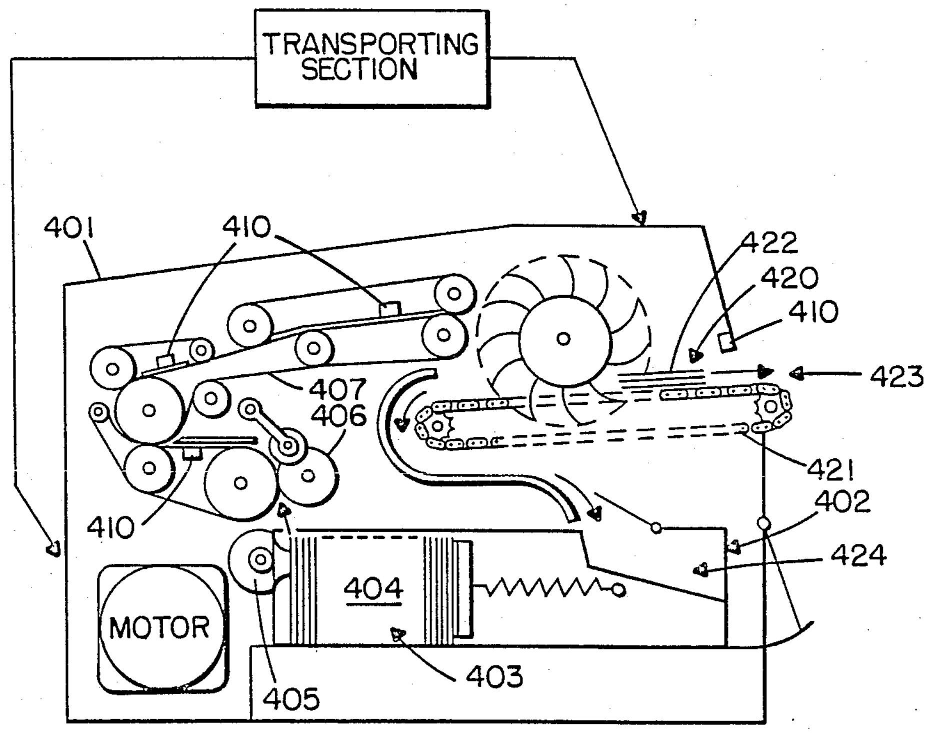
FIG. 4 is a schematic diagram of a conventional automatic bill handling machine.

Prior to a description of a preferred embodiment of the invention, the prior art device shown in FIG. 4 will be described. On the bottom of the main body of an automatic cash dispenser 401, a separate bill container 402 is detachably mounted. Bills 404, contained vertically with the widthwise edge downwards in bill hopper 403, are drawn out one by one from the left in response to a user instruction, for example, by pickup rollers 405. The bills are then conveyed by conveyor means such as rollers 406 and belt 407, and stacked in a temporary bill storage area (escrow 420). Abnormal operations, such as the failure of bill drawing, overlapping of bills, and drawing more than one bill, are checked, and the number of bills are counted by means of a plurality of sensors 410 provided in the path of the bills. In response to whether the results of the check is satisfactory or unsatisfactory, chain belt 421 is rotated clockwise to convey bills 422, stacked in the temporary storage area 420, to outlet 423 and to deliver them to the user; or chain belt 421 is rotated counterclockwise to direct the bills into withdrawn bill container 424.

Figure 1:
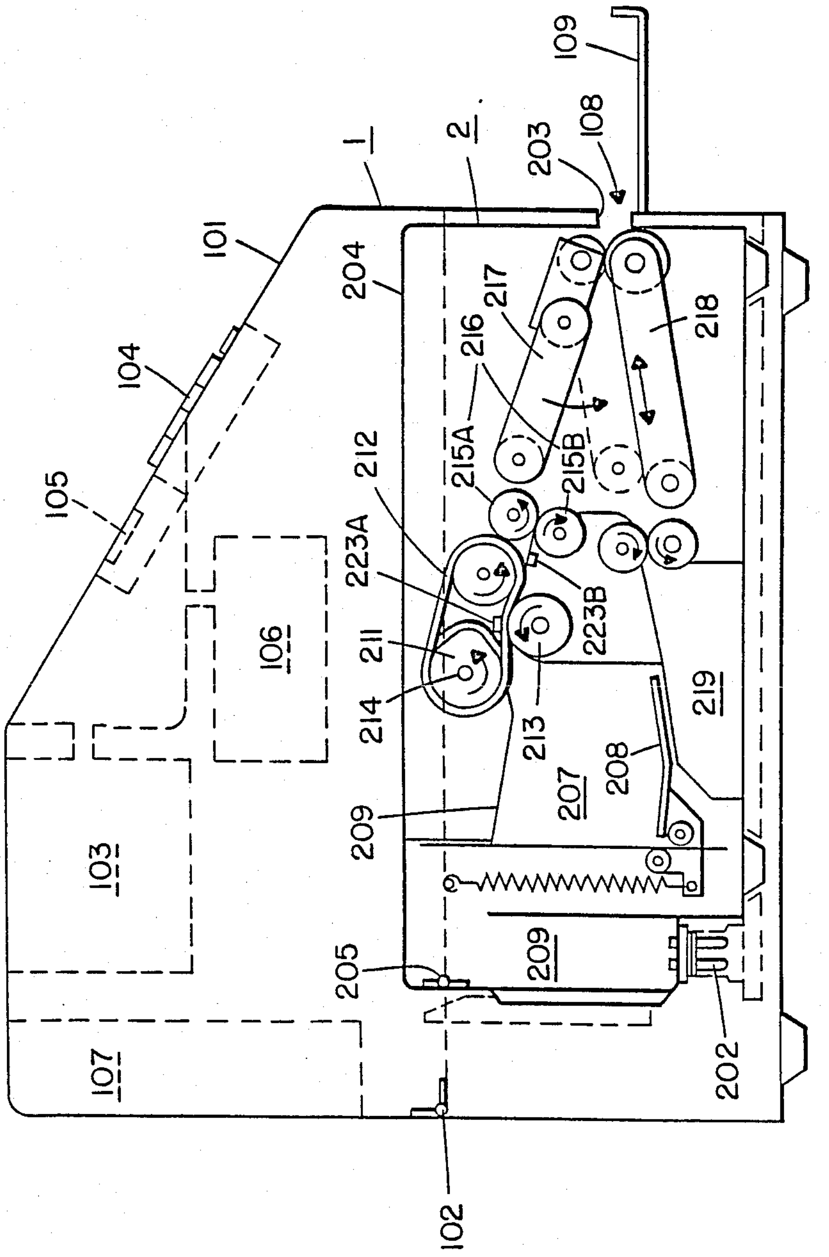
FIG. 1 is a diagram illustrating the main body of a bill handling machine with a detachable bill container mounted in the main body.

FIG. 1 shows an automatic bill handling machine embodying the invention. The embodiment may be a terminal which can be operated by remote control from a host computer or by an independent offline control. The main body of automatic cash dispenser 1 has an ID card reader 103, a keyboard 104 for inputting the user's personal code number and amount or specifying the number of bills, a display 105, a printer 106 for recording data, a control circuit 107, an outlet 108, and a receiving tray 109. It should be noted that in accordance with this invention, no path for the physical transfer of bills is provided in the main body.

A bill container 2, consisting mainly of a bill hopper 207, bill conveyor means 211-215, a temporary bill storage area 216, and a withdrawal bill storage area 219, and having a unique construction, is detachably mounted in the main body. Although FIG. 1 shows a desktop automatic bill handling machine, this invention can also be applied to console or wall mount type machines.

Figure 2:
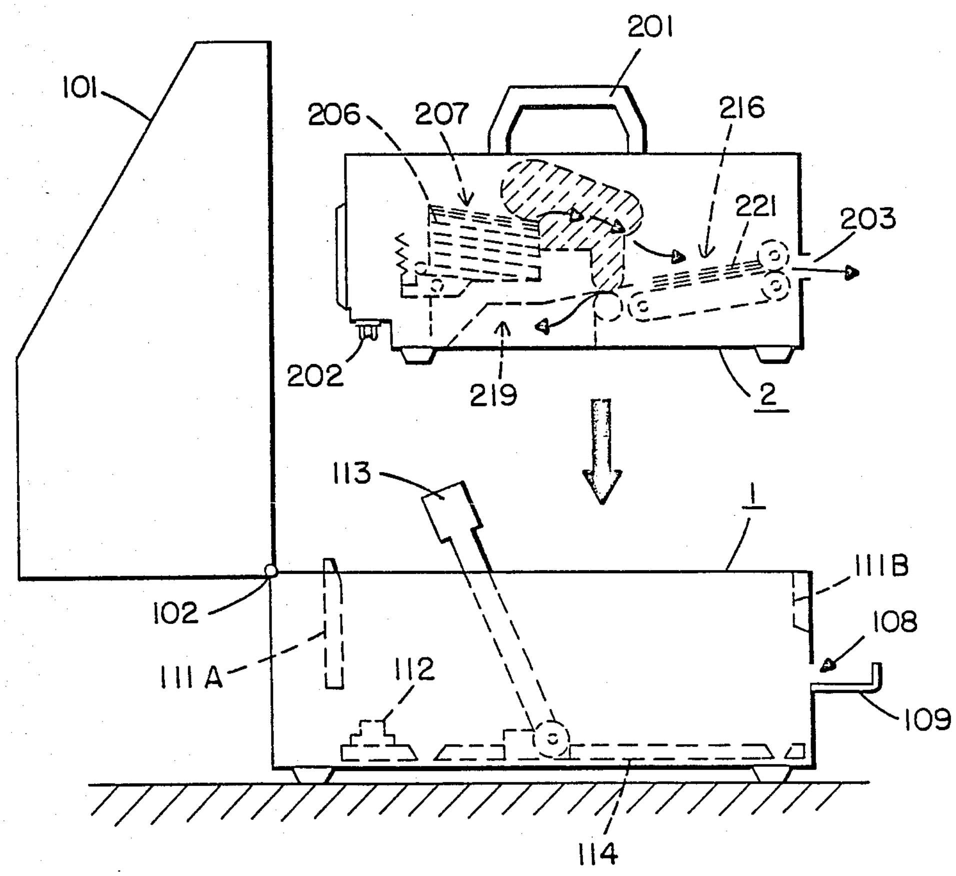
FIG. 2 is a diagram which illustrates the mode of mounting the bill container in the main body and the movement of bills therein.
Figure 3:
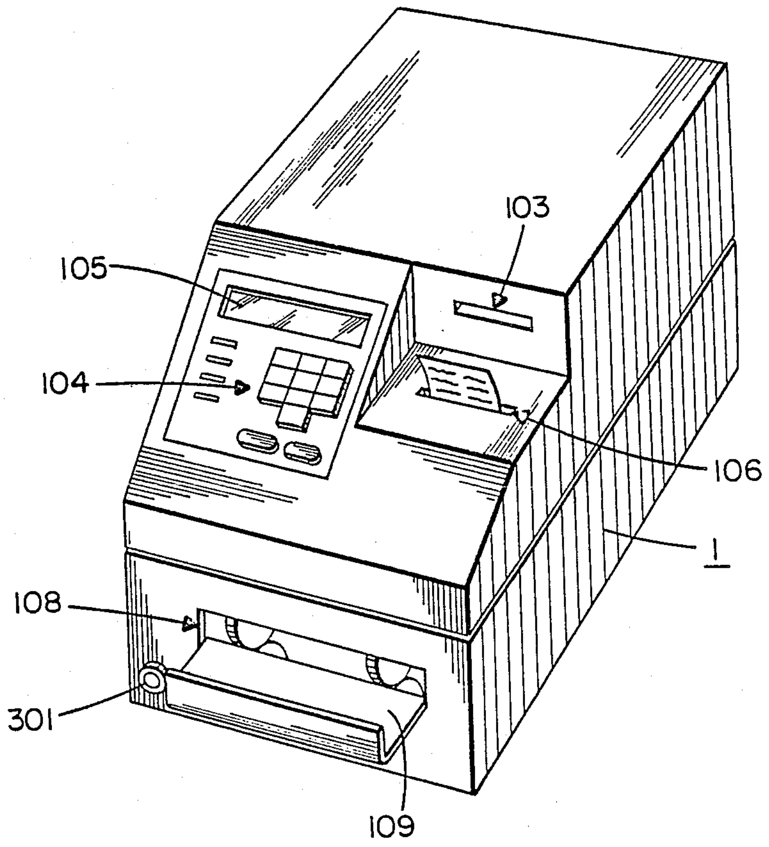
FIG. 3 is a perspective view of the main body.

When bill container 2 is mounted in the main body, the upper cover 101 using a hinge 102, as FIG. 2 shows, is opened. The bill container is held by hand using lifting handle 201 on the top of the bill container, inserted into the main body along guide rails 111A and 111B, and seated on the platform 114 on the bottom of the main body. Connector 202 of bill container 2 is then connected to connector 112 of the main body. Thus, bill container 2 and the main body are electrically connected. Then, by swinging clamp handle 113 clockwise, for example, the bill container is moved to the right together with platform 114, and clamped in a fixed position. By this action, outlet 203 of bill container 2 is aligned with outlet 108 of the main body.

Bills 206 are stacked substantially horizontally in bill hopper 207 and pushed upwards by spring 209 which presses hopper tray 208 upwards. Bills 206 in bill hopper 207 are picked up by pickup roller 211 (FIG. 1) sequentially from the uppermost bill, in response to the user's instruction, and conveyed by belt 212. Roller 213, rotating counterclockwise, prevents more than one bill at a time from being conveyed due to overlapping or sticking together. Bills are then stacked in temporary storage area (escrow) 216 by a pair of rollers 215A and 215B.

Sensors are provided in the above described conveying path. For example, in response to detection signals from sensors 223A and 223B indicating the stack of bills 221 have been validated per the user's instruction, the bills 221 are lowered from the level shown by the solid line illustration 217 to the level shown by the broken line illustration, and conveyed via belt 218 to outlet 203. If they are not validated, the stack of bills 221 is collected in withdrawal bill storage area 219.

Upper cover 204 of bill container 2 can be opened or closed about hinge 205 to load bills 206 into bill hopper 207, and can be locked for security. If a side cover (not shown) is provided in place of upper cover 204 to load bills from the side, bills collected in withdrawal bill storage area 219 can also be taken out from the side.

In the method for automatic bill handling according to this invention, the constituents of the bill conveying path, where jamming is apt to occur are not components of the main body, but are enclosed in a detachable bill container 2, so that bills are counted and checked in the container 2, separately stacked in container 2, and only after confirmation that the bills can be delivered to the user, are they discharged out of the container 2.

Detachable bill container 2, must be small and light in order to maintain portability while still containing all the built-in conveying means. For example, the bill conveying path is so arranged that the bills 206 are held substantially horizontal in hopper 207, and conveyed substantially horizontally to the outlet.

Arranging the entire system vertically or diagonally, or arranging only the hopper vertically or diagonally are other acceptable embodiments.

The drive source (e.g. motor) for rotating rollers and belts in bill container 2 may be installed in main body 1 or inside of bill container 2. If the drive source is installed inside of main body 1, the size of the bill container 2 can be further reduced even though a means to transmit the rotation force to bill container 2, such as a gear or belt, is required. If the drive source is installed inside of bill container 2, the bill container 2 can be more easily attached to and detached from main body 1.

By adding intelligent functions, through the use of a microprocessor or the like, to enable data to be recorded and read regarding the number and kinds of bills accommodated, the number of abnormal handlings, and the number of bills which remain in the container (including jammed bills), system management is facilitated.

If a plurality of bill containers 2 are installed in the main body, for example, two or more kinds of bills can be handled automatically.

Furthermore, if the interchange of installed containers or the switching of the operation/stop functions are executed by an instruction from the host computer, automatic correction of abnormalities such as bill jams can be realized by centralized remote control.

The technical concepts of this invention can be applied not only to cash dispensers but also to automatic bill handling machines including automatic deposit machines.

It can thus be seen that since functional recovery, when a jam of bills occurs, may be performed by an operator without special qualifications or authorization (by removal and replacement of the bill container), this invention provides many advantages to both users and owners of automatic bill handling machines through the reduction of downtime and labor costs.

Accordingly, this invention is not to be regarded as limited to the embodiments disclosed herein, but is to limited as defined by the appended claims.

We claim:

1. An automatic bill handler including a main body and means associated with said main body for entering user data and instructions and for determining the validity or invalidity thereof, said bill handler further adapted to receive a detachable bill container which comprises:

- a bill hopper;
- conveyor means for moving bills from said bill hopper and stacking said bills in a temporary bill storage area;
- sensor means associated with said conveyor means for sensing bills;
- a bill outlet for the discharge of bills from said bill container;
- a withdrawal bill storage area;
- additional conveyor means for moving said bills from said temporary bill storage area to either said bill outlet or said withdrawal bill storage area depending upon said determination of the validity or invalidity of said user data and instructions.

2. The invention as defined in claim 1 wherein said detachable bill container, in the event of a bill jam, is removable for replacement by a properly operative bill container.

3. The invention as defined in claim 2 wherein substantially all bill handling mechanisms associated with said automatic bill handler are contained in said detachable bill container.

4. The invention as recited in claim 3 further comprising:

- means for recording the number of bills initially placed in said bill container, the number of bills remaining in said bill container and the occurence of functional abnormalities.

5. The invention as recited in claim 4 wherein said bill container is provided with a connection which automatically connects with a connector in said bill handler when said bill container is emplaced in said bill handler.

6. The invention as described in claim 5 further including means for holding and moving said bill container into proper position within said bill handler.

7. A method for bill handling in an automatic bill handling machine wherein bills, which are stored in a detachably mounted bill container, are conveyed to a temporary bill storage area and stacked in response to a user's instruction and after validation, said temporarily stacked bills are delivered to a user, the method comprising:

separating a part of said stored bills in the bill container in response to a user's instruction, and stacking said bills in said temporary bill storage area all without carrying said bills out of said bill container;

discharging said separated and stacked bills out of the container only after the validity of said user instruction has been validated and if said user instruction is not validated, holding said separated and stacked bills in the container and conveying them to a withdrawal bill storage area.

* * * * *